United States Patent [19]

Heidemann et al.

[11] Patent Number: 5,517,232
[45] Date of Patent: May 14, 1996

[54] CABLE TELEVISION DISTRIBUTION NETWORK WITH VIDEO-ON-DEMAND TRANSMISSION

[75] Inventors: Rolf Heidemann, Tamm; Heinz Krimmel, Korntal-Münch. both of Germany

[73] Assignee: Alcatel SEL Aktiengesellschaft, Stuttgart, Germany

[21] Appl. No.: 271,521

[22] Filed: Jul. 7, 1994

[30] Foreign Application Priority Data

Jul. 10, 1993 [DE] Germany ............................ 43 23 147.0

[51] Int. Cl.$^6$ ............................................... H04N 7/22
[52] U.S. Cl. ............................ 348/7; 359/123; 359/125; 348/6
[58] Field of Search ...................... 348/6, 7, 8, 12, 348/13, 385, 386, 10, 11; 359/125, 126, 118, 115, 124, 123, 109, 135, 137; 455/3.1, 4.1, 4.2, 5.1, 6.1, 6.2, 6.3; H04N 7/173, 7/10, 7/22

[56] References Cited

U.S. PATENT DOCUMENTS

| 5,119,188 | 6/1992 | McCalley et al. |  |
|---|---|---|---|
| 5,418,559 | 5/1995 | Blahut | 348/10 |
| 5,442,700 | 8/1995 | Snell et al. | 380/15 |

FOREIGN PATENT DOCUMENTS

| 0419137 | 3/1991 | European Pat. Off. |  |
|---|---|---|---|
| 0305698 | 12/1989 | Japan | 359/123 |
| 0357727 | 12/1992 | Japan | 348/385 |

OTHER PUBLICATIONS

Chiddix et al., "Fiber Backbone: A Proposal for an Evolutionary Network Architecture" 1988 NCTA technical Papers pp. 73–82.

Cotten et al. "Fiber–Optic Digital Video Systems for Commercial TV Trunking Applications" SPIE vol. 139 Guided Wave Optical Systems and Devices (1978) pp. 53–62.

Terry, Jack "Alternative Technologies and Delivery Systems for Broadband ISDN Access" IEEE Communication Magazine, Aug. 1992 pp. 58–64.

IEEE International Conference on Communications '93, Bd 2, 23 Mai 1993 Geneva, Switzerland. pp. 715–721; XP00037119 Leung et al. 'A Modular Multirate Video Switch—Design and Dimensioning'.

Patent Abstracts of Japan, vol. 010 No. 016 (E–375), 22 Jan. 1986 & JP–A–60 177781 (Fujitsu KK; Others: 01) 11 Sep. 1985.

18th International Television Symposium and Technical Exhibition, 10 Jun. 1993—15 Jun. 1993, Montreux, Switzerland pp. 831–842 XP000379398 Utsumi et al 'Optical Fiber Broadcasting System'.

(List continued on next page.)

*Primary Examiner*—David E. Harvey
*Attorney, Agent, or Firm*—Ware, Fressola, Van Der Sluys & Adolphson

[57] ABSTRACT

It is desirable to offer the subscribers of a cable television distribution network, in addition to the cable TV service, a video-on-demand service. Since, in the foreseeable future, the fiber-optic portion of the cable television distribution networks will not extend to the subscribers (111) but will terminate in optical network terminations (ONT$_i$) from which a respective optical access network (108–110) will extend to the subscribers, the problem arises how to transmit the entirety of subscriber-assigned video signals to the subscribers so that the latter can receive the requested video signals. According to the invention, the transmission from the center (100) through the fiber-optic distribution network (101–107) to the optical network terminations (ONT$_i$) is digital, using time- and wavelength-division multiplexing. In each optical network termination, only that portion of subscriber-assigned video signals is removed which is intended for subscribers connected to the optical network termination (ONT$_i$). The removed subscriber-assigned video signals are modulated onto subcarriers ($M_1$–$M_6$) and frequency-division-multiplexed with the cable TV signals which are distributed over the electrical access network (108–110) to the subscribers (111) connected to the optical network termination.

20 Claims, 2 Drawing Sheets

OTHER PUBLICATIONS

Journal of Lightwave Technology, Bd. 11, Nr. 1, Jan. 1993 New York, US, pp. 60–68, XP 000377986 Olshansky et al. 'Subcarrier Multiplexed Broad-Band Service Network: A Flexible Platform for Broad-Band Subscriber Services.

"Fiber in the Loop" from Elektrisches Nachtrichtenwesen (English—Electrical Communication, vol. 65, No. 1, pp. 44–51, Band 65, No. 1.

"Optical Video Transport/Distribution System with Video on Demand Service" by Yamashita et al, from SPIE vol. 1817 Optical Communications (1992), pp. 12–22.

"Subscriber Distribution Networks Using Compressed Digital Video" by Olshansky, et al, from Journal of Lightwave Technology. vol. 10, No. 11, Nov. 1992, pp. 1760–1765.

"Elektrisches Nachrichtenwesen" (English article entitled Optoelectonics in the Subscriber Loop by Adnet et al, from Electrical Communication—4th Quarter 1992, pp. 58–65.).

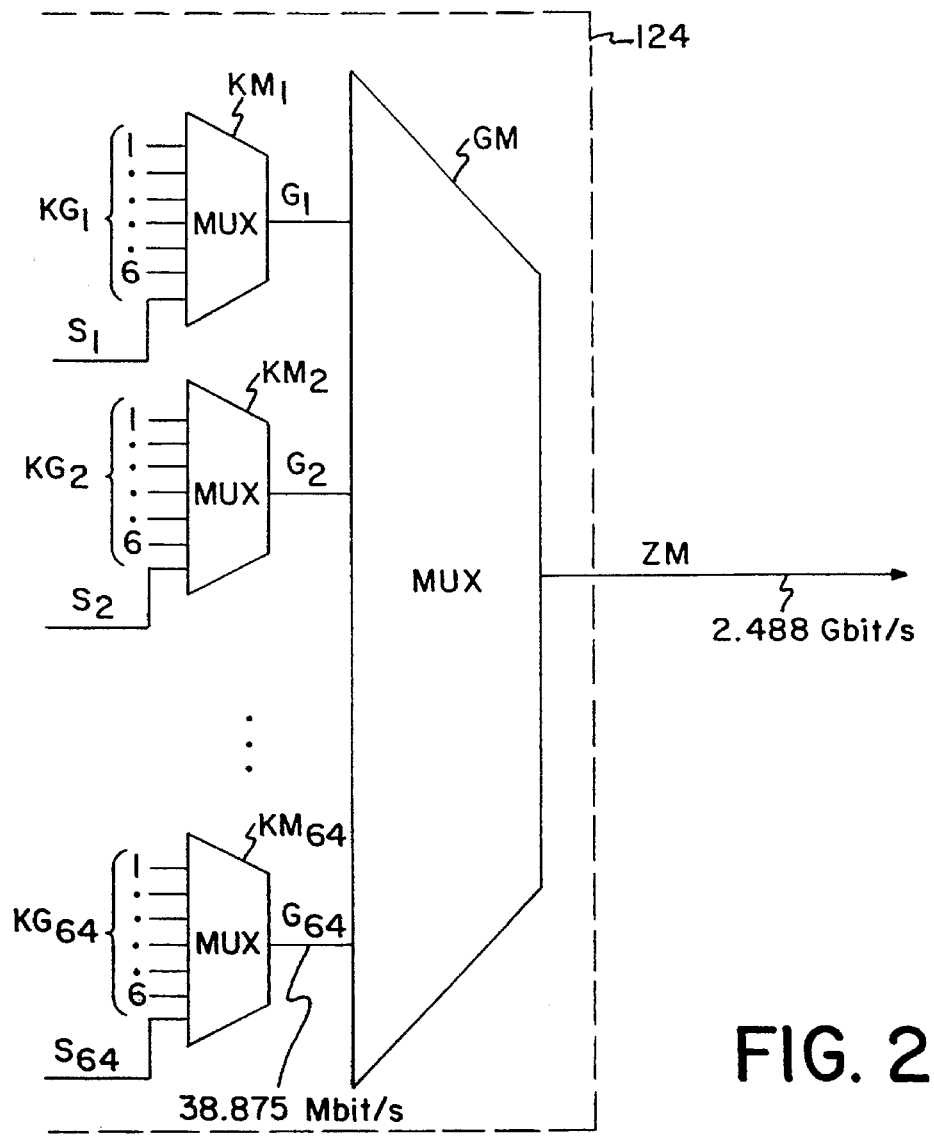
FIG. 2
FIG. 3
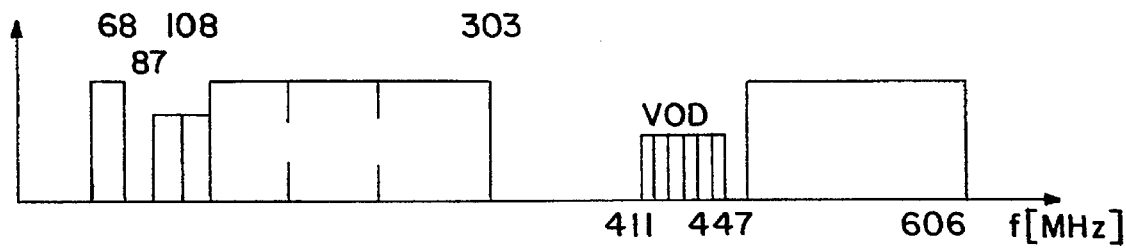

CABLE TELEVISION DISTRIBUTION NETWORK WITH VIDEO-ON-DEMAND TRANSMISSION

TECHNICAL FIELD

The present invention relates to a cable television distribution network of the type having a fiber-optic distribution network extending from a center to optical network terminations, a respective electrical access network extending from each of the optical network terminations to a respective one of a plurality of groups of subscribers for distributing cable television signals to the subscribers, and means within the center for transmitting, in addition to cable television signals, subscriber-assigned video signals together with the cable television signals to the optical network terminations using wavelength-division multiplexing.

BACKGROUND OF THE INVENTION

A cable television distribution network with the above features is known from SPIE Vol. 1817 Optical Communications (1992), pp. 12–22, particularly from FIGS. 3 and 6. There, the fiber-optic distribution network is a ring network. The subscriber-assigned video signals, which have to be transmitted from the center (referred to there as "basic unit") to the subscribers of the cable television distribution network, are transmitted as analog signals. The video signals are modulated onto subcarriers of different frequencies, and the modulated subcarriers (37 subcarriers) are combined into a frequency-division-multiplexed signal which is transmitted to optical network terminations (referred to there as "optical network units", ONUs) together with the cable television signals using wavelength-division multiplexing. Table 1 shows that several wavelengths must be used to enable a total of 400 cable television subscribers to access individual video programs. This shows that to implement the video-on-demand service in cable television distribution networks of, e.g., more than 4000 subscribers, a great number of wavelengths is necessary. This involves a great amount of complexity in the wavelength-division demultiplexers in the optical network terminations and, thus, high costs. Another disadvantage of the prior art system is that in each optical network termination, for each subscriber connected thereto, a selection of a subset of programs is made from the entirety of the programs transmitted to the optical network termination. This requires, however, that the electrical access network extending from an optical network termination to a group of subscribers connected thereto should be a star network, as shown in FIG. 6 of the cited publication. This limitation, however, is not compatible with the structure of cable television distribution networks currently under discussion, such as the cable television distribution network described in "Elektrisches Nachrichtenwesen", 4. Quartal 1992, pp. 58–65, particularly FIG. 3, since for such networks, a tree structure rather than a star structure of the electrical access network is typical.

From JOURNAL OF LIGHTWAVE TECHNOLOGY, VOL. 10, NO. 11, November 1992, pp. 1760–1765, a cable television distribution network is known which is also designed to provide video-on-demand service. There, the video signals (and the associated audio signals) are transmitted not as analog signals, but as digital signals which are the result of a compressing analog-to-digital conversion. As the multiplexing technique for combining the digital video signals, frequency-division multiplexing is preferred over time-division multiplexing, since the suitable time-division multiplexing methods are claimed to be either not flexible enough or too expensive in the foreseeable future. The optical transmission uses the same optical carrier with which the cable television signals are distributed. All video signals are transmitted to all subscribers, e.g., 200–400 subscribers. However, for the cable television distribution networks currently under discussion, in which the fiber-optic network does not extend to the subscribers, but rather an electrical access network is provided between optical network terminations of the fiber-optic distribution network and the subscribers, this is not possible, because the electrical access network has a much lower transmission capacity than the fiber-optic distribution network.

SUMMARY OF THE INVENTION

It is the object of the invention to provide a cable television distribution network with which the subscribers can be offered the video-on-demand service and which does not have the above-described disadvantages of the prior art networks providing the video-on-demand service. In particular, the network is realizable at low cost, and necessary changes in the structure of realistically suitable cable television distribution networks can be kept to a minimum.

The object is attained by a cable television distribution network of the above type wherein the center includes means for making available the subscriber-assigned video signals as digital signals, for combining the entirety of digital subscriber-assigned video signals intended for subscribers connected to the optical network terminations into a time-division-multiplexed signal, and for optically distributing the latter with the cable television signals to the optical network terminations using wavelength-division multiplexing, and that each optical network termination includes means for receiving the time-division-multiplexed signal, for extracting therefrom the video signals intended for subscribers connected to the optical network termination, and for frequency-division-multiplexing said extracted video signals with the cable television signals which are distributed from the optical network termination to the subscribers connected to said optical network termination as set forth in claim 1. Further advantageous features of the invention are defined in the subclaims.

In the following, the gist of the invention will first be summarized. The invention is based on the assumption that a considerable part of the cable television distribution networks which stand a chance to be introduced anywhere in the world in the near future has the property that the fiber-optic distribution network does not extend to the homes or apartments of the subscribers but terminates at the side of the street (curb) in optical network terminations, from which an electrical access network provides the connection to the subscribers. This network structure, which is retained in the present invention, is described, for example, in the above-mentioned article published in "Elektrisches Nachtrichtenwesen" or in another article in "Elektrisches Nachrichtenwesen", Band 65, No. 1, pp. 44–51, FIG. 2. With the invention, the transmission capacity of such a network structure is taken into account, and low-cost, efficient additional facilities are provided for making available the video-on-demand service.

The essential features of the invention are:

The novel cable television distribution network has the known structure in which a fiber-optic distribution network extends to optical network terminations and in which an electrical access network extends from each optical network termination to the group of subscribers connected to the latter.

The video signals to be transmitted to the entirety of the subscribers of the network for providing the video-on-demand service are transmitted as digital signals up to the subscribers.

Time-division multiplexing is used to combine the subscriber-assigned video signals at the center.

The time-division-multiplexed signal formed at the center is transmitted, i.e., distributed, to the optical network terminations with the cable television signals (with a single additional wavelength) using wavelength-division multiplexing.

Each optical network termination receives the optical signal containing the subscriber-assigned video signals, converts it to an electric signal, and extracts therefrom the subset of those subscriber-assigned video signals which are intended for subscribers connected to it.

Only this subset of signals is transmitted from the respective optical network termination over the electrical access network to the subscribers connected to the optical network termination, i.e., distributed to the subscribers.

The method of transmission used for this is a frequency-division-multiplexing method in which the video signals to be transmitted are modulated onto subcarriers and in which the modulated subcarriers are combined into a frequency-division-multiplexed signal which is added to the composite cable television signal.

Each subscriber to the video-on-demand service selects and receives the subscriber-assigned video signal intended for him or her from the set of subscriber-assigned video signals which are distributed to the whole group of subscribers connected to an optical network termination.

BRIEF DESCRIPTION OF THE DRAWINGS

The invention will now be explained in more detail with reference to the accompanying drawings, in which:

FIG. 2 shows the structure of the time-division multiplexer 124 of FIG. 1, and

FIG. 3 shows the frequency plan of a future cable television system with a band into which signals of the video-on-demand service are insertable in accordance with the invention.

BEST MODE FOR CARRYING OUT THE INVENTION

Figure 1:
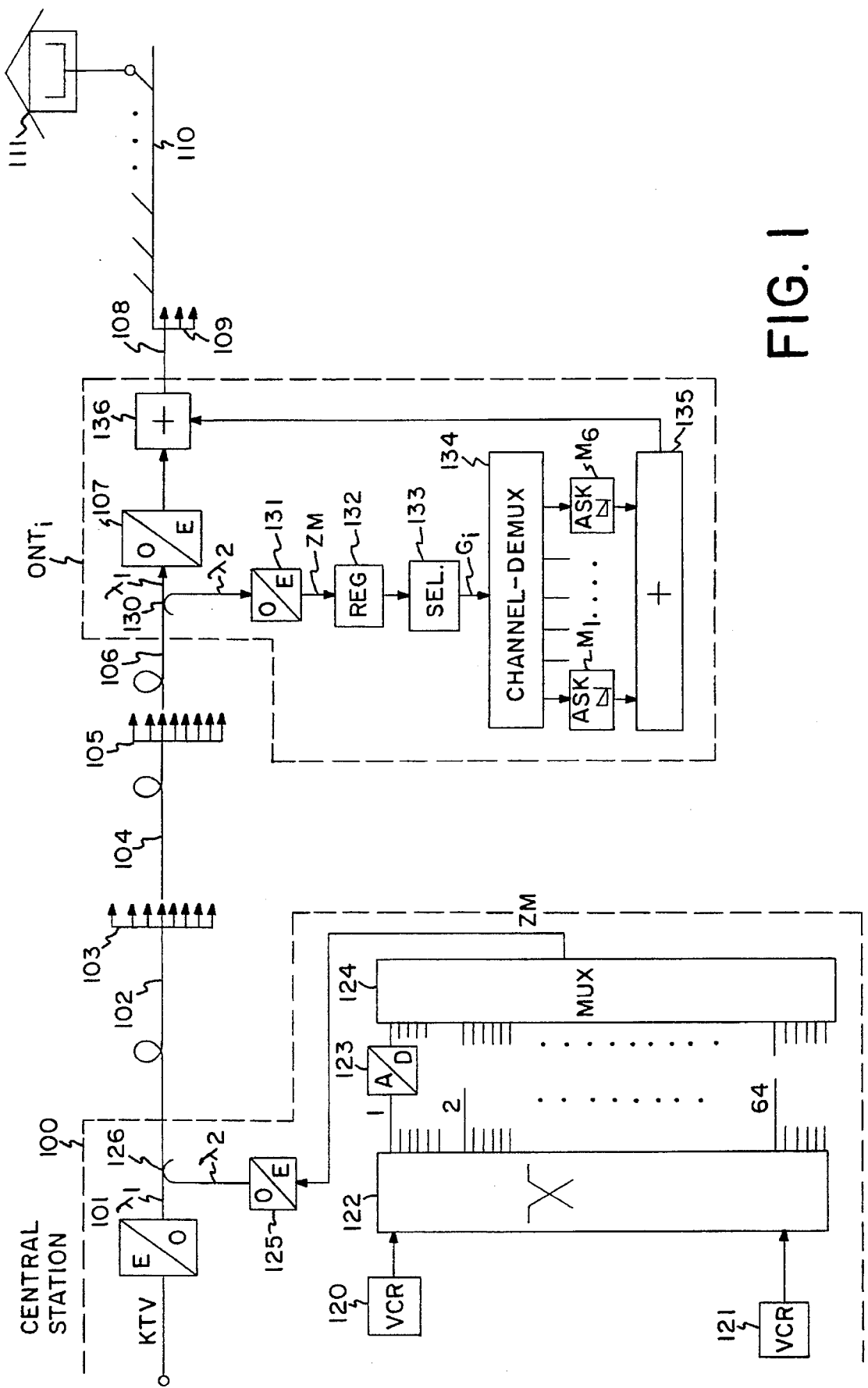
FIG. 1 shows the essential features of the novel cable television distribution network.

The upper portion of FIG. 1 shows the known cable television distribution network as is illustrated, for example, in FIG. 3 on page 60 of the above-mentioned publication "Elektrisches Nachrichtenwesen", 4. Quartal 1992.

A cable-television center 100 (head end) contains an electrical-to-optical transducer 101 which converts the composite signal for transmitting the cable-television programs and sound programs, designated KTV, into an optical signal with a wavelength $\lambda_1$ of 1550 nm. This optical signal passes through a fiber-optic distribution network, of which an optical waveguide 102, a beam splitter 103, an optical waveguide 104 extending from the latter to a beam splitter 105, and an optical waveguide 106 extending from the beam splitter 105 to an optical network termination ($ONT_i$) are shown, to a number of optical network terminations. This number is 64 if the beam splitters are 1×8 splitters. The optical network termination shown ($ONT_i$) is representative of all 64 of those terminations, and the optical waveguide 104 and the beam splitter 105 are representative of eight such waveguides and splitters. Fiberoptic amplifiers, which are present at different points of the fiber-optic distribution network, have been omitted in the drawing.

For simplicity, the abbreviation ONT will be used for each optical network termination, sometimes provided with the subscript i to indicate that the ONT no. i of 64 ONTs is meant. In each ONT, the optical waveguide terminates at the input of an optical-to-electrical transducer 107.

From each ONT, as shown for the optical network termination $ONT_i$, an electrical access network, generally a coaxial cable network, which is also branched several times as shown, extends to cable television connections at subscribers, of whom one subscriber 111 is represented symbolically by a house. The access network terminates at a drop point near each subscriber. In the example shown, a line 108 of the electrical access network is branched at a cable branching element 109 into four lines 110, each of which has eight branches that are branched again into two lines at the subscriber 111. Thus, the composite cable TV signal made available at the center is distributed via the fiber-optic distribution network and the electrical access networks to a plurality of subscribers, 4096 subscribers in the example being considered.

According to the invention, in order to enable the subscribers to make use of a video-on-demand service, the cable television distribution network described is extended as follows. The center 100 contains storages for video films, e.g., a number of video cassette recorders (VCR), of which two are shown by way of example and designated 120 and 121, and which are operated by the video-on-demand-service provider. If a subscriber expresses a wish, via a telephone link or via a backward channel to be installed in the cable television distribution network, to see a particular video film, the cassette containing the film will be inserted into one of the video cassette recorders and played back. The outputs of the video cassette recorders are connected to inputs of a switching facility 122 which is controlled in accordance with the subscriber's wish so that the video film is transmitted to the subscriber on a channel to which the subscriber has access. To this end, the outputs of the switching facility 122 are divided into groups, each of which is associated with one of the ONTs. The outputs belonging to a group of outputs represent channels to which the subscribers connected to the ONT with which the group is associated have access. Since in the example being described the number of ONTs is 64, there are 64 groups of outputs of the switching facility 122, as indicated in the drawing. In other words: There are 64 groups of channels on which video signals can be transmitted to the subscribers of the cable television distribution network.

According to the invention, the transmission of the video signals over the channels is digital. The bit rate for the transmission of a video signal over a channel depends, on the one hand, on the available video encoding techniques and, on the other hand, on the quality requirements placed on the video signal. As is known from the above-mentioned publication JOURNAL OF LIGHTWAVE TECHNOLOGY, there are encoding techniques which allow a video signal to be transmitted with good cable television quality at a bit rate of 6 Mb/s.

Thus, for the example serving to explain the invention, it is assumed that the bit rate in a channel is 6 Mb/s. It is further assumed that, according to the estimated acceptance of the video-on-demand service, it will be sufficient to have six channels for a group of subscribers connected to an ONT. Accordingly, in the example being considered, 64 channel groups are present (one for each optical network termination), and each channel group has six channels with a bit rate of 6 Mb/s in each channel. In the example being considered it is assumed that the video signals are present in their source in analog form, and also pass through the switching facility in analog form. Therefore, each output line of the switching facility 122 contains an analog-to-digital converter 123, in other words, a video coder. It is also possible that the video signals are present in the storage from which they are retrievable, e.g., in a magnetic or optical mass storage device, in compressed digital form, so that the analog-to-digital converters 123 are not necessary.

To ensure that the subscriber-assigned video signals to be transmitted can only be received by those subscribers who have ordered them and are paying for them, the signals are encrypted with a subscriber-assigned key. The encryption device, which is necessary at the center for each channel, has been omitted in the drawing.

A multiplexer 124 combines the video signals from the 64 6-channel groups into a time-division-multiplexed signal which appears at its output designated ZM (occasionally, signals are designated by the same reference characters as the lines carrying them). An electrical-to-optical transducer 125 converts the multiplexed signal to an optical signal with a wavelength $\lambda_2$ of, e.g., 1530 nm, and a wavelength-division multiplexer 126, which is a fiber-optic coupler, couples the optical signal of wavelength $\lambda_2$ into the optical waveguide 102, which also carries the composite cable TV signal as an optical signal of wavelength $\lambda_1$. Thus it is ensured that the entirety of digital subscriber-assigned video signals is distributed to the ONTs as a time-division-multiplexed signal together with the cable TV signals in using wavelength-division multiplexing. The fiber-optic amplifiers present in the fiber-optic distribution network are suitable for both wavelengths.

The structure and operation of the multiplexer 124 of FIG. 1 will now be explained with the aid of FIG. 2. As already indicated in FIG. 1, the multiplexer 124 has 64 groups of 6 inputs each. It thus receives signals from 64 channel groups, designated in FIG. 2 by $KG_1$ to $KG_{64}$. For each of these channel groups, the multiplexer 124 contains a channel multiplexer which combines the video signals from the associated six channels into a group multiplex signal and inserts additional bits into the latter which serve to identify the channel group and to synchronize the demultiplexer that divides the respective group multiplex signal into the original signals. The channel multiplexers are denoted by $KM_1$ to $KM_{64}$, their outputs, providing the group multiplex signals, by $G_1$ to $G_{64}$, and their inputs receiving the additional bits (from sources not shown) are denoted by $S_1$ to $S_{64}$.

The group multiplex signal formed by a channel multiplexer has a bit rate of 38.875 MHz if each of the six channels has a bit rate of 6 Mb/s and the number of inserted additional bits is such that the net bit rate of 36 Mb/s and the additional bits give the bit rate of 38.875 Mb/s. The channel multiplexers may use any time-division-multiplexing technique.

Instead of the bit rate of 6 Mb/s per channel, other bit rates, e.g., 2 Mb/s, may be present, as well as channels with different bit rates within a channel group. Advantageously, three 2-Mb/s channels, for example, may be time-division-multiplexed into a standard 6-Mb/s channel and remain multiplexed until decoded at the subscriber. What is essential for the invention is that a channel multiplexer time-division-multiplexes those video signals into a group multiplex signal which is intended for subscribers connected to the same ONT. Each channel multiplexer is thus associated with one of the ONTs.

The time-division-multiplexing facility 124 further includes a group multiplexer whose inputs are supplied with the group multiplex signals $G_1$ to $G_{64}$, and which combines the latter into a time-division-multiplexed signal, which appears at its output ZM. The bit rate of the time-division-multiplexed signal is 2.488 Gb/s (64× 38.875 Mb/s).

The combination of the 64 input signals into a time-division-multiplexed signal in the group multiplexer GM can be carried out in principle by any time-division-multiplexing technique. Advantageously, the 64 digital input signals $G_1$ to $G_{64}$ are bit-interleaved. This means that every 64th bit of the time-division-multiplexed signal generated by the group multiplexer GM is a bit of the same group multiplex signal, e.g., a bit of $G_1$.

To further describe the invention, reference is again made to FIG. 1. As mentioned above, the time-division-multiplexed signal ZM, containing the entirety of the video signals, is distributed to all 64 ONTs. Each of the ONTs, of which one is shown and designated $ONT_i$, receives and processes the time-division-multiplexed signal as follows:

It includes a wavelength-division multiplexer 130, in the simplest case a wavelength-selective fused fiber coupler, as indicated in the figure. The coupler extracts the optical signal of wavelength $\lambda_2$ from the wavelength-division-multiplexed signal and passes it to the input of an optical-to-electrical transducer 131. The output of the latter provides the electric time-division-multiplexed signal ZM generated at the transmitting end. This signal is regenerated in a regenerater 132 and is then applied to a selector 133. The latter is designed to remove from the time-division-multiplexed signal the group multiplex signal which is intended for the group of subscribers connected to the optical network termination, i.e., which contains the video signals intended for those subscribers.

The selector 133 will be particularly simple if the time-division-multiplexed signal is formed by bit-interleaving the group multiplex signals, as mentioned above. In that case, the selector simply samples the time-division-multiplexed signal at a rate equal to one-64th of the bit rate of the time-division-multiplexed signal ZM (2.488 GHz), for every 64th bit of the time-division-multiplexed signal belongs to one group multiplex signal. The sampling thus gives a bit stream which is a group multiplex signal.

The selector 133 now must check whether the group multiplex signal removed by sampling is the one intended for the ONT or a signal intended for another ONT. To this end, it checks the identifier added to the group multiplex signal. If the removed group multiplex signal is found to be the one intended for the ONT, the selector will retain the phase of its sampling clock; if the selector does not find its own identifier in the group multiplex signal, the latter is not intended for it and the selector will shift the phase of the sampling clock by one bit period of the time-division-multiplexed signal, and check the identifier until it has determined for any sampling phase that the sampled group multiplex signal is the one intended for the ONT. Alternatively, the selector may calculate the necessary phase shift from the difference between the identifier sought for and the identifier found, and perform the phase shift in a single step.

The advantage of the bit-interleaving at the transmitting end and the simple sampling of every 64th bit in the optical network termination is that the selector can operate at a clock rate which is adapted to the lowest bit rate of 38.875 Mb/s and not to the bit rate of its input signal, which is higher by a factor of 64.

The output of the selector 133 provides a group multiplex signal $G_i$ which is intended for the optical network termination whose reference characters are provided with the same subscript, i.e., $ONT_i$. The signal is applied to a channel demultiplexer which is the counterpart of one of the channel multiplexers $KM_i$ of FIG. 2 and separates the group multiplex signal into its individual video signals, in this example into six video signals, which appear at its parallel outputs.

These video signals, which are intended for subscribers connected to the $ONT_i$, are transmitted to those subscribers as follows: For each of the six video signals, the ONT includes a modulator which modulates the video signal onto a subcarrier. The six modulators are designated $M_1$ to $M_6$. In the simplest case, the type of modulation is amplitude-shift keying (ASK) of the subcarrier.

The subcarriers used in the modulators lie in a frequency range which is not allocated to or reserved for the cable TV service but lies within the transmissible frequency band of the electrical access network. FIG. 3 shows the frequency band which is valid at this time, and likely to be valid in the future, for cable TV service over electric coaxial cables. The six subcarriers, which are each modulated by one of the six video signals, are spaced by 6 MHz and occupy the frequency band from 411 to 447 MHz. The band is designated in FIG. 3 by VOD ("video on demand"). The other rectangular areas designate cable TV frequency bands which have been or are to be allocated to either sound programs or cable TV programs.

FIG. 1 shows a power combiner 135, which combines the six subcarriers into a frequency-division-multiplexed signal that is added by another power combiner 136 or a diplex filter to the composite cable TV signal using frequency-division multiplexing, so that a composite signal with frequencies as shown in FIG. 3, which contains both the analog cable TV signal and the digital video-on-demand signals, is distributed from the output of the power combiner 136 via the electrical access network to the subscribers connected to the $ONT_i$.

The composite signal is now received by all those subscribers, but only the subscriber who has requested a video-on-demand signal contained therein is informed of the key with which he or she can decrypt the requested signal, so that it can be decoded with the aid of the subscriber's video decoder. Alternatively, a subscriber who is interested in the video-on-demand service may procure from the service provider a fixed, individually assigned key which is stored, for example, on a magnetic card and, if the card is inserted into the subscriber's video decoder, enables the latter to decode only the video signal intended for the subscriber. Then the subscriber need not be informed of the key each time a video signal is sent to him or her.

In any case, the novel system has the advantage that every subscriber can access one of six channels installed for the service, i.e., that the channel selection is made only at the subscriber, not already in the optical network termination. This makes it possible for a subscriber to receive video signals on several channels at a time.

The number of channels for the video-on-demand service which are available to a group of subscribers connected to an optical network termination can be increased if further subcarriers which lie in frequency bands not allocated to the cable TV service are used, or if the encoding is done at a lower bit rate, so that the frequency spacing of the subcarriers can be smaller. Alternatively, the subcarrier spacing can be retained and the signals, encoded at a lower bit rate, can be combined into a time-division-multiplexed signal, e.g., a 6-Mb/s signal, which is then modulated onto a subcarrier.

The following describes the sequences of operations which are performed in the novel system if a subscriber orders a particular video signal, such as a video film. For such orders, use can be made either of the telephone network or of a backward channel which is installed between the subscribers and the center via the cable television distribution network. If a subscriber who belongs to a group of subscribers connected to an optical network termination $ONT_i$ has informed the center that he or she wants to see a particular program, the center will search for an idle channel in the channel group $KG_i$ associated with the optical network termination $ONT_i$ to which the subscriber is connected. If, for example, channel 1 or channel group $KG_i$ is idle, the center will inform the subscriber that the desired program can be received on channel 1, possibly also the time at which the transmission will probably begin. This information is sent, for example, over the telephone network or over a signalling channel to be installed via the cable television distribution network. The key used by the center to encrypt the video signal to be transmitted is either stored on a magnetic card or notified to the subscriber by the center. The center then initiates playback of the desired video signal, analog-to-digital conversion and compression if the signal is present in analog form, and, in any case, encryption with the subscriber-assigned key. The video signal to be transmitted then passes through the switching facility of the center and is placed on the idle channel 1 of channel group $KG_i$. It is thus ensured that the video signal reaches the subscriber who has ordered it.

It should be pointed out that the invention is not limited to the transmission of video signals. It is also possible, of course, to transmit other types of signals, such as audio signals, to subscribers on demand if a subscriber wants to hear a particular sound recording (e.g., music, lecture), for example. Such a transmission, like the transmission of video signals, is digital, and the subscriber needs an audio decoder into which the key can be entered for decryption, as described above for video decoders. Different audio signals, combined using time-division multiplexing, may occupy a single video channel (e.g., a 6-Mb/s channel) and share a single modulator.

In conclusion it should be mentioned that the devices required to form the time-division-multiplexed signal ZM, which contains all digital video signals, need not necessarily be located at the center. They may also be located remote from the center, even many kilometers, so that the video signals to be transmitted from the center are transmitted from said devices over a feeder link to the center.

We claim:

1. A cable television distribution network comprising:

a center (100) for providing cable television signals one or more optical network terminations ($ONT_i$), a fiber optic distribution network (101 to 107) extending from said center (100) to said optical network terminations ($ONT_i$ for transmission of said cable television signals from said center (100) to said optical network terminations ($ONT_i$, a respective electrical access network extending from each one of said optical network terminations ($ONT_i$ to a respective one of a plurality of groups of subscribers (111), each respective electrical access network distributing said cable television signals to said respective one of Said plurality of groups of subscribers, and means (120 to 125) for providing, in addition to said cable television signals (KTV), subscriber-assigned video signals together with said cable television signals for transmission to said optical network terminations (ONT$_i$) via said fiber optic distribution network using wavelength-division multiplexing, said means for transmitting including:

means (123 to 126) for converting said subscriber-assigned video signals into digital subscriber-assigned video signals, means for combining said digital subscriber-assigned video signals which are intended for subscribers connected to said optical network terminations (ONT$_i$) into a time-division-multiplexed signal (ZM), and means for optically distributing said time-division-multiplexed signal (ZM) with said cable television signals to said optical network terminations (ONT$_i$) using wavelength-division multiplexing, and wherein each respective one of said optical network terminations (ONT$_i$), includes:

means (130 to 136, M$_1$ to M$_6$) for receiving said time-division-multiplexed signal (ZM) with said cable television signals, means for extracting from said time-division-multiplexed signal (ZM) said digital subscriber-assigned video signals (G$_1$ which are intended for subscribers connected to said respective one of said optical network terminations (ONT$_i$), and means for frequency-division-multiplexing said extracted digital subscriber-assigned video signals with said cable television signals and for distributing said frequency-division-multiplexed signals from said respective one of said optical network terminations (ONT$_1$) to the subscribers (111) connected to said respective one of said optical network terminations (ONT$_1$.

2. A cable television distribution network as claimed in claim 1, wherein said means for combining said digital subscriber-assigned video signals comprises:

a channel multiplexer (KM$_1$ to KM$_{64}$) which combines said digital subscriber-assigned video signals (KG$_1$) which are intended for subscribers (111) connected to said respective one of said optical network terminations (ONT$_1$) into a group multiplex signal (G$_1$) using time-division multiplexing, and a group multiplexer (GM) which combines said group multiplex signals (G$_1$ to G$_{64}$) for all of said optical network terminations into said time-division-multiplexed signal (ZM) (FIG. 2).

3. A cable television distribution network as claimed in claim 2, wherein in said group multiplexer (GM), said group multiplex signals (G$_1$ to G$_{64}$) are bit-interleaved.

4. A cable television distribution network as claimed in claim 2, wherein said means for extracting includes:

a selector (133) which extracts said group multiplex signal (G$_1$) from said time-division-multiplexed signal (ZM), and a channel demultiplexer (134) which separates said group multiplex signal (G$_1$) into said digital subscriber-assigned video signals, and wherein said means for frequency-division-multiplexing includes:

modulators (M$_1$ to M$_6$) which each modulate one of said digital subscriber-assigned video signals onto a respective subcarrier, and power combiners (135, 136) which combine said modulated subcarriers with said cable television signals using frequency-division multiplexing.

5. A cable television distribution network as claimed in claim 4, wherein each of the modulators (M$_1$ to M$_6$) modulates one of said digital subscriber-assigned video signals onto said respective subcarrier by amplitude-shift keying, and wherein said subcarriers lie in a frequency range (VOD, FIG. 3) which is not occupied by said cable television signals.

6. A cable television distribution network as claimed in claim 5, wherein said cable television distribution network comprises means for providing subscriber-assigned audio signals in addition to said subscriber-assigned video signals in a corresponding manner for transmission via said fiber optic distribution network.

7. A cable television distribution network as claimed in claim 1, wherein said means for converting said subscriber-assigned video signals are located remote from said center.

8. A cable television distribution network as claimed in claim 1, wherein said means for combining said digital subscriber-assigned video signals are located remote from said center.

9. A cable television distribution network as claimed in claim 1, wherein said means for converting said subscriber-assigned video signals and said means for combining said digital subscriber-assigned video signals are located remote from said center.

10. A cable television distribution network as claimed in claim 1, wherein said means for converting said subscriber-assigned video signals are located in said center.

11. A cable television distribution network as claimed in claim 1, wherein said means for combining said digital subscriber-assigned video signals are located in said center.

12. A cable television distribution network as claimed in claim 1, wherein said means for converting said subscriber-assigned video signals and said means for combining said digital subscriber-assigned video signals are located in said center.

13. A cable television distribution network comprising:

a center (100) for providing cable television signals, one or more optical network terminations (ONT$_i$), a fiber optic distribution network (101 to 107) extending from said center (100) to said optical network terminations (ONT$_i$) for transmission of said cable television signals from said center (100) to said optical network terminations (ONT$_i$), a respective electrical access network extending from each one of said optical network terminations (ONT$_i$) to a respective one of a plurality of groups of subscribers (111), each respective electrical access network distributing said cable television signals to said respective one of said plurality of groups of subscribers, and means (120 to 125) for providing, in addition to said cable television signals (KTV), subscriber-assigned audio signals together with said cable television signals for transmission to said optical network terminations (ONT$_i$) via said fiber optic distribution network using wavelength-division multiplexing, said means for transmitting including:

means (123 to 126) for converting said subscriber-assigned audio signals into digital subscriber-assigned audio signals, means for combining said digital subscriber-assigned audio signals which are intended for subscribers connected to said optical network terminations ($ONT_i$) into a time-division-multiplexed signal (ZM), and means for optically distributing said time-division-multiplexed signal (ZM) with said cable television signals to said optical network terminations ($ONT_i$) using wavelength-division multiplexing, and wherein each respective one of said optical network terminations ($ONT_i$), includes:

means (130 to 136, $M_1$ to $M_6$) for receiving said time-division-multiplexed signal (ZM) with said cable television signals, means for extracting from said time-division-multiplexed signal (ZM) said digital subscriber-assigned audio signals ($G_1$) which are intended for subscribers connected to said respective one of said optical network terminations ($ONT_i$), and means for frequency-division-multiplexing said extracted digital subscriber-assigned audio signals with said cable television signals and for distributing said frequency-division-multiplexed signals from said respective one of said optical network terminations ($ONT_1$) to the subscribers (111) connected to said respective one of said optical network terminations ($ONT_1$).

14. A cable television distribution network as claimed in claim 13, wherein said means for combining said digital subscriber-assigned audio signals comprises:

a channel multiplexer ($KM_1$ to $KM_{64}$) which combines said digital subscriber-assigned audio signals ($KG_1$) which are intended for subscribers (111) connected to said respective one of said optical network terminations ($ONT_1$ into a group multiplex signal ($G_1$) using time-division multiplexing, and a group multiplexer (GM) which combines said group multiplex signals ($G_1$ to $G_{64}$) for all of said optical network terminations into said time-division-multiplexed signal (ZM) (FIG. 2).

15. A cable television distribution network as claimed in claim 14, wherein in said group multiplexer (GM), said group multiplex signals ($G_1$ to $G_{64}$) are bit-interleaved.

16. A cable television distribution network as claimed in claim 14, wherein said means for extracting includes:

a selector (133) which extracts said group multiplex signal ($G_1$) from said time-division-multiplexed signal (ZM), and a channel demultiplexer (134) which separates said group multiplex signal ($G_1$) into said digital subscriber-assigned audio signals, and wherein said means for frequency-division-multiplexing includes:

modulators ($M_1$ to $M_6$) which each modulate one of said digital subscriber-assigned audio signals onto a respective subcarrier, and power combiners (135, 136) which combine said modulated subcarriers with said cable television signals using frequency-division multiplexing.

17. A cable television distribution network as claimed in claim 16, wherein each of the modulators ($M_1$ to $M_6$) modulates one of said digital subscriber-assigned audio signals onto said respective subcarrier by amplitude-shift keying, and wherein said subcarriers lie in a frequency range (VOD, FIG. 3) which is not occupied by said cable television signals.

18. A cable television distribution network as claimed in claim 17, wherein said cable television distribution network comprises means for providing subscriber-assigned video signals in addition to said subscriber-assigned audio signals in a corresponding manner for transmission via said fiber optic distribution network.

19. A cable television distribution network as claimed in claim 13, wherein said means for converting said subscriber-assigned audio signals and said means for combining said digital subscriber-assigned audio signals are located remote from said center.

20. A cable television distribution network as claimed in claim 13, wherein said means for converting said subscriber-assigned audio signals and said means for combining said digital subscriber-assigned audio signals are located in said center.

* * * * *

UNITED STATES PATENT AND TRADEMARK OFFICE
CERTIFICATE OF CORRECTION

PATENT NO. : 5,517,232
DATED : May 14, 1996
INVENTOR(S) : Heidemann et al.

It is certified that error appears in the above-indentified patent and that said Letters Patent is hereby corrected as shown below:

Claim 1, column 8, line 61 replace "$(ONT_i$" with --$(ONT_i)$--

Claim 1, column 8, line 63 replace "$(ONT_i$" with --$(ONT_i)$--

Claim 1, column 8, line 65 replace "$(ONT_i$" with --$(ONT_i)$--

Claim 1, column 9, line 2 replace "of Said plurality" with --of said plurality--

Claim 1, column 9, line 29 replace "$(G_1$" with --$(G_1)$--

Claim 1, column 9, line 38 replace "$(ONT_1$" with --$(ONT_1)$--

Claim 14, column 11, line 32 replace "$(ONT_1$" with --$(ONT_1)$--

Signed and Sealed this

Tenth Day of September, 1996

Attest:

BRUCE LEHMAN

*Attesting Officer*          *Commissioner of Patents and Trademarks*